(12) United States Patent
Hagari et al.

(10) Patent No.: US 8,635,005 B2
(45) Date of Patent: Jan. 21, 2014

(54) CONTROL DEVICE OF INTERNAL COMBUSTION ENGINE

(75) Inventors: Hideki Hagari, Chiyoda-ku (JP);
Tomokazu Makino, Chiyoda-ku (JP);
Keitaro Ezumi, Aki-gun (JP);
Tomokuni Kusunoki, Aki-gun (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 96 days.

(21) Appl. No.: 13/445,241

(22) Filed: Apr. 12, 2012

(65) Prior Publication Data

US 2012/0266844 A1  Oct. 25, 2012

(30) Foreign Application Priority Data

Apr. 20, 2011 (JP) ................................. 2011-094043

(51) Int. Cl.
*F02P 5/152* (2006.01)

(52) U.S. Cl.
USPC ............. 701/111; 123/406.21; 123/406.26; 123/406.29; 123/406.38

(58) Field of Classification Search
USPC ........... 701/111; 123/406.21, 406.26, 406.29, 123/406.38, 406.39
See application file for complete search history.

(56) References Cited

U.S. PATENT DOCUMENTS

| | | | | |
|---|---|---|---|---|
| 4,640,250 A | * | 2/1987 | Hosaka et al. | 123/406.35 |
| 6,105,552 A | * | 8/2000 | Arisawa et al. | 123/406.37 |
| 6,561,163 B1 | * | 5/2003 | Takahashi et al. | 123/406.21 |
| 6,827,061 B2 | * | 12/2004 | Nytomt et al. | 123/406.27 |
| 8,245,692 B2 | * | 8/2012 | Glugla et al. | 123/406.29 |
| 8,347,852 B2 | * | 1/2013 | Glugla et al. | 123/305 |
| 8,406,984 B2 | * | 3/2013 | Glugla et al. | 701/111 |
| 2007/0215107 A1 | * | 9/2007 | Shelby et al. | 123/406.26 |
| 2011/0139118 A1 | * | 6/2011 | Glugla et al. | 123/406.29 |
| 2011/0246049 A1 | * | 10/2011 | Matsuo et al. | 701/111 |
| 2013/0179052 A1 | * | 7/2013 | Kawakami et al. | 701/111 |

FOREIGN PATENT DOCUMENTS

| | | |
|---|---|---|
| JP | 06-264813 A | 9/1994 |
| JP | 08-319931 A | 12/1996 |
| JP | 10-030977 A | 2/1998 |
| JP | 3082634 B2 | 8/2000 |
| JP | 3093467 B2 | 10/2000 |
| JP | 3116826 B2 | 12/2000 |
| JP | 2002-357156 A | 12/2002 |

\* cited by examiner

*Primary Examiner* — Erick Solis
(74) *Attorney, Agent, or Firm* — Sughrue Mion, PLLC

(57) ABSTRACT

A control device of an internal combustion engine includes a filter processing portion which performs a filter processing on the vibration level extracted by the vibration level extraction portion, and calculates a vibration level after the filter processing; and an abnormal ignition suppression control portion which compares the vibration level after the filter processing to the abnormal ignition determination value when a retard correction equal to or greater than a predetermined value is performed by the knock control portion, in a case where it is determined that the vibration level after the filter processing is equal to or greater than the abnormal ignition determination value, determines that the abnormal ignition is generated in the internal combustion engine, corrects and controls the combustion control portion in a direction of suppressing the abnormal ignition.

11 Claims, 11 Drawing Sheets

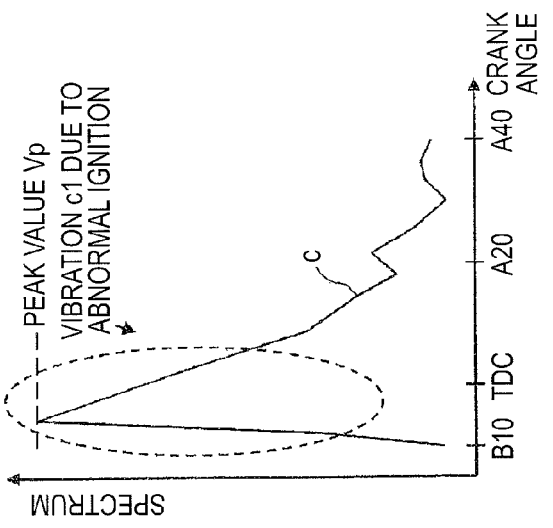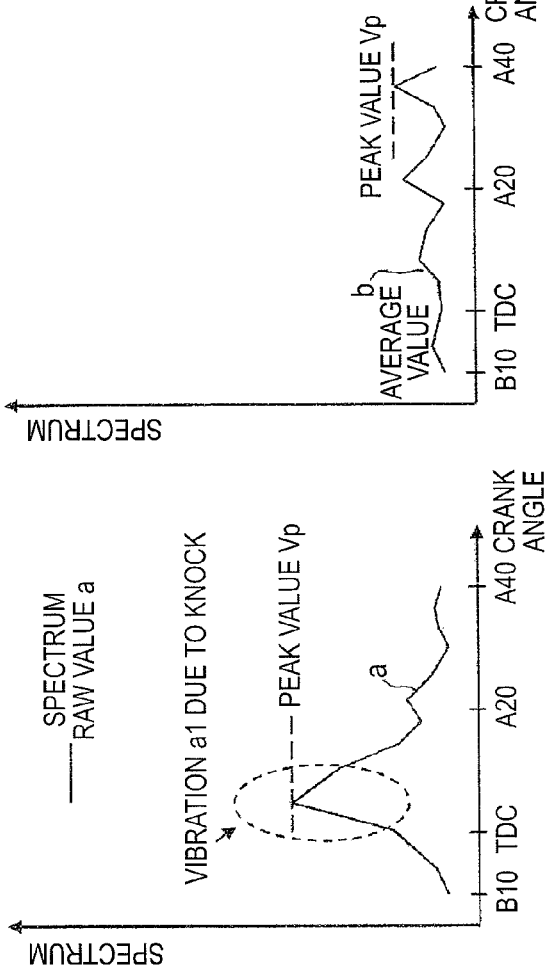

KNOCK SENSOR SIGNAL WHEN KNOCK IS GENERATED (ONCE GAIN)

KNOCK SENSOR SIGNAL WHEN KNOCK IS NOT GENERATED (ONCE GAIN)

KNOCK SENSOR SIGNAL DURING ABNORMAL IGNITION (ONCE GAIN)

KNOCK SENSOR SIGNAL DURING ABNORMAL IGNITION (0.5 TIMES GAIN)

FIG.8A

| INTERNAL COMBUSTION ENGINE ROTATIONAL SPEED | 1000 | 2000 | 3000 | 4000 | 5000 | 6000 |
|---|---|---|---|---|---|---|
| CORRECTION VALUE | 1.5 | 1.2 | 1 | 1 | 0.9 | 0.8 |

FIG.8B

| CYLINDER NUMBER | #1 | #2 | #3 | #4 |
|---|---|---|---|---|
| CORRECTION VALUE | 1.2 | 1 | 1 | 1.2 |

WHEN FILTER COEFFICIENT IS NOT SWITCHED OVER

WHEN FILTER COEFFICIENT IS SWITCHED OVER

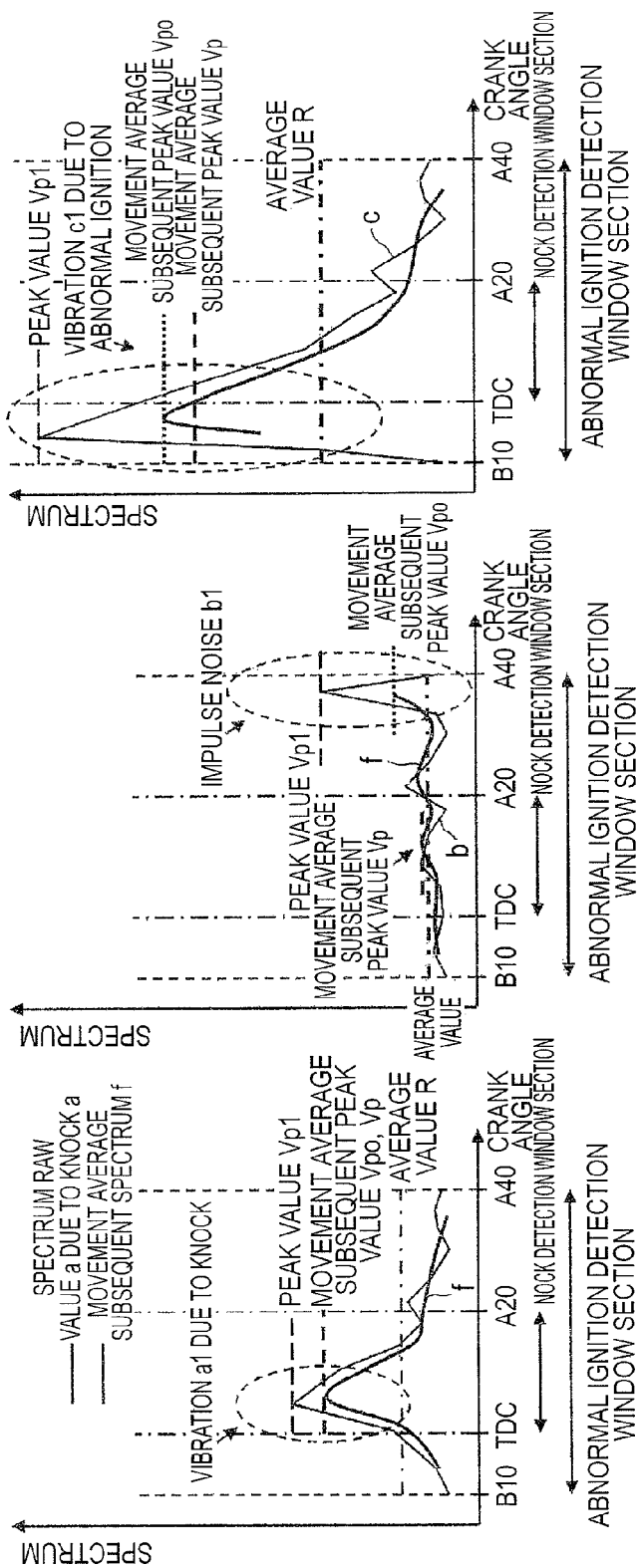

CONTROL DEVICE OF INTERNAL COMBUSTION ENGINE

BACKGROUND OF THE INVENTION

1. Field of the Invention

The present invention relates to a control device of an internal combustion engine, more specifically, a control device of an internal combustion engine which distinguishes and detects an abnormal combustion generated in an internal combustion engine, for example, into an abnormal ignition such as a knock, a pre-ignition or a post-ignition, thereby permitting the control suitable for each abnormal combustion to perform.

2. Background Art

Generally, it is known that, when a knock as one abnormal combustion of the internal combustion engine is generated during operation of the internal combustion engine, a vibration of a natural frequency band is generated in the internal combustion engine depending on a configuration of the internal combustion engine or a vibration mode of the knock. However, from the related art, a control device of an internal combustion engine is suggested which detects the knock generated in the internal combustion engine using a vibration sensor and performs the control of the internal combustion engine based on the detection value. The device of the related art measures a vibration intensity of the natural frequency band generated in the internal combustion engine to detect the knock, and performs a retard correction of the ignition timing of the internal combustion engine to suppress the knock.

As a specific method of measuring the vibration intensity of the natural frequency of the internal combustion engine, a method of inputting an output of a vibration sensor via a band pass filter constituted by an analog circuit to a peak hold circuit and measuring the vibration intensity based on the peak hold value after the band pass filter obtained by the peak hold circuit (for example, see Patent Document 1), a method of performing a digital signal processing such as FFT (Fast Fourier Transform) on the output of the vibration sensor and measuring the vibration intensity by the spectrum value of the natural frequency (for example, see Patent Document 2) or the like are suggested.

In the internal combustion engine, after a spark ignition by an ignition plug, a flame spreads around the ignition plug. However, at this time, a phenomenon, in which an end gas as an unburned gaseous mixture located far from the installation position of the ignition plug is pressed against a wall surface of a piston or a cylinder, comes to have a high temperature and a high pressure, and is self-ignited, is considered to be a knock as an abnormal combustion. When the knock is generated, a shock wave is generated, whereby the vibration or a metallic sound of a block of the internal combustion engine is generated.

Meanwhile, it is known that, as the abnormal combustion generated in the internal combustion engine, besides the knock mentioned above, the abnormal ignition called pre-ignition or post-ignition also exists. Furthermore, it is considered that, in the abnormal ignition called pre-ignition or post-ignition, there is a case (hereinafter, referred to as a heat source self ignition) where a deposit in the ignition plug or a pipe becomes a high temperature, becomes a heat source and leads to the ignition, a case (hereinafter, referred to as a compression self ignition) where the gaseous mixture comes to have a high temperature and a high pressure in a compression stroke when a compression ratio is high, and leads to the self ignition, or the like. Even in the case of the abnormal ignition as the abnormal combustion, in some cases, the pressure in the pipe or the vibration, the metallic sound of the internal combustion engine block or the like is involved.

Among the abnormal ignitions mentioned above, the abnormal ignition generated before a regular flame ignition is called a pre-ignition, and the abnormal ignition generated after the regular flame ignition is called a post-ignition. Since the abnormal ignitions are phenomena that perform the combustion regardless of the ignition timing, in some cases, the abnormal ignitions are not suppressed even when retarding the ignition timing. The abnormal ignition as the abnormal combustion is generally known (for example, see, non-Patent Documents 1 and 2), when the abnormal ignition is generated, an unpleasant metallic sound is generated or variation in the output of the internal combustion engine or the like is generated, and in an extreme case, the internal combustion engine may be damaged.

When the abnormal ignition such as the pre-ignition or the post-ignition mentioned above is generated, since the abnormal vibration of the internal combustion engine may be involved, a method of implementing the detection of the abnormal ignition by applying the knock detection method mentioned above is suggested. As the method, a method (for example, see Patent Document 3) of deciding an occurrence of the abnormal ignition based on a time difference between the ignition timing and the abnormal vibration occurrence timing or a method (for example, see Patent Document 4) of deciding an occurrence of the abnormal ignition when a state continues where a time interval, while the abnormal vibration equal to or greater than a predetermined level is not detected, is shorter than a predetermined interval, is suggested.

PATENT DOCUMENT

[Patent Document 1] JP-A-2002-357156
[Patent Document 2] specification and drawings of Japanese Patent No. 3093467
[Patent Document 3] specification and drawings of Japanese Patent No. 3082634
[Patent Document 4] specification and drawings of Japanese Patent No. 3116826

Non-Patent Document

[Non-Patent Document 1] "University Lecture Internal Combustion Engine" Maruzen written by Itsuro Kimura, Tadayoshi Sakai, 1980 (pages 82 to 84)
[Non-Patent Document 2] "Internal Combustion Engine Lecture" first volume, written by Nagao Fujio, 1980 (pages 216 to 223)

However, in the determination method of determining the occurrence of the abnormal ignition based on the time difference between the ignition timing and the vibration occurrence timing described in Patent Document 3, there is a problem in that, since the internal combustion engine is always vibrated during operation, it is difficult to specify the vibration occurrence timing due to the abnormal ignition, and even if a starting position or a peak position of a relatively high vibration is detected as the vibration occurrence timing, the positions are greatly irregular, and there is a case where a normal knock is erroneously determined as the abnormal ignition or a case where a detection omission of the abnormal ignition is generated.

Furthermore, in Patent Document 3, a method is disclosed in which pre-ignition is determined when the vibration is increased regardless of the lag of the ignition timing. However, at the time of the occurrence of the abnormal ignition, for example, there are many cases where the strong vibration is sporadic or where the strong vibration is generated from the start and is increased or decreased, as well as a case where the vibration level is gradually increased. Thus, there is a problem in that, in some cases, the detection omission of the abnormal ignition is generated even by the disclosed method.

Furthermore, when a case continues where a time interval, while the abnormal vibration equal to or greater than a predetermined level is not detected, is shorter than a predetermined interval, in the method shown in the Patent Document 4 mentioned above which decides the occurrence of the abnormal ignition, there is a problem in that, even when the abnormal vibration of a level greatly exceeding the predetermined level is generated, in some cases, the detection cannot be performed when the occurrence interval is continuously generated at an interval slightly longer than a predetermined interval. Furthermore, Patent Document 4 also discloses a method of calculating a cumulative value of the occurrence frequency of the abnormal vibration and determining the pre-ignition when the cumulative value is equal to or greater than a pre-ignition determination value. However, there is a problem in that, when a fuel having a low-octane number is used, since the strong vibration is generated at a high frequency until the ignition retard correction is sufficient even in the knock generated during acceleration or the like, in some cases, the knock is erroneously determined as the abnormal ignition when using only such a frequency.

SUMMARY OF THE INVENTION

The present invention was made in view of the aforementioned problems in the device of the related art, and an object thereof is to provide a control device of an internal combustion engine that promptly distinguishes and detects a knock and an abnormal ignition called a pre-ignition or a post-ignition, and controls the internal combustion engine by a suppressing method suitable for each abnormal combustion.

The control device of the internal combustion engine according to the present invention has an operation state detecting portion that detects an operation state of the internal combustion engine; a combustion control portion that controls a combustion state of the internal combustion engine depending on the detected operation state of the internal combustion engine; a vibration sensor that is attached to a cylinder block of the internal combustion engine to detect the vibration of the internal combustion engine; a vibration level extraction portion that extracts a vibration level of a predetermined frequency range in the vibration detected by the vibration sensor within a predetermined crank angle range of the internal combustion engine; and a knock control portion which compares the extracted vibration level to a knock determination value, when it is determined that the vibration level is equal to or greater than the knock determination value, determines that a knock is generated in the internal combustion engine, performs a retard correction of an ignition timing of the internal combustion engine, and suppresses the knock, wherein the control device of the internal combustion engine includes a filter processing portion that performs a filter processing on the vibration level extracted by the vibration level extraction portion and calculates the vibration level after the filter processing; and an abnormal ignition suppression control portion which compares the vibration level after the filter processing to the abnormal ignition determination value when the retard correction equal to or greater than a predetermined value is performed by the knock control portion, in a case where it is determined that the vibration level after the filter processing is equal to or greater than the abnormal ignition determination value, determines that the abnormal ignition is generated in the internal combustion engine, corrects and controls the combustion control portion in a direction of suppressing the abnormal ignition.

According to the present invention, the control device of the internal combustion engine includes the filter processing portion that performs a filter processing on the vibration level extracted by the vibration level extraction portion and calculates the vibration level after the filter processing; and the abnormal ignition suppression control portion which compares the vibration level after the filter processing to the abnormal ignition determination value when the retard correction equal to or greater than a predetermined value is performed by the knock control portion, in a case where it is determined that the vibration level after the filter processing is equal to or greater than the abnormal ignition determination value, determines that the abnormal ignition is generated in the internal combustion engine, corrects and controls the combustion control portion in a direction of suppressing the abnormal ignition. Thus, since it is possible to distinguish the knock and the abnormal ignition and execute the control suitable for each abnormal combustion, the abnormal combustion can be suitably suppressed.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIGS. 4A to 4C are explanatory diagrams that show a spectrum analysis result in the control device of the internal combustion engine according to the first embodiment of the present invention.

FIGS. 8A and 8B are explanatory diagrams that show a correction amount of a vibration level based on a rotational speed of the internal combustion engine, and a correction amount of a vibration level for each cylinder, in the control device of the internal combustion engine according to the first embodiment of the present invention.

FIGS. 12A to 12C are explanatory diagrams that show a spectrum analysis result in the control device of the internal combustion engine according to the second embodiment of the present invention.

DETAILED DESCRIPTION OF THE INVENTION

First Embodiment

Figure 1:
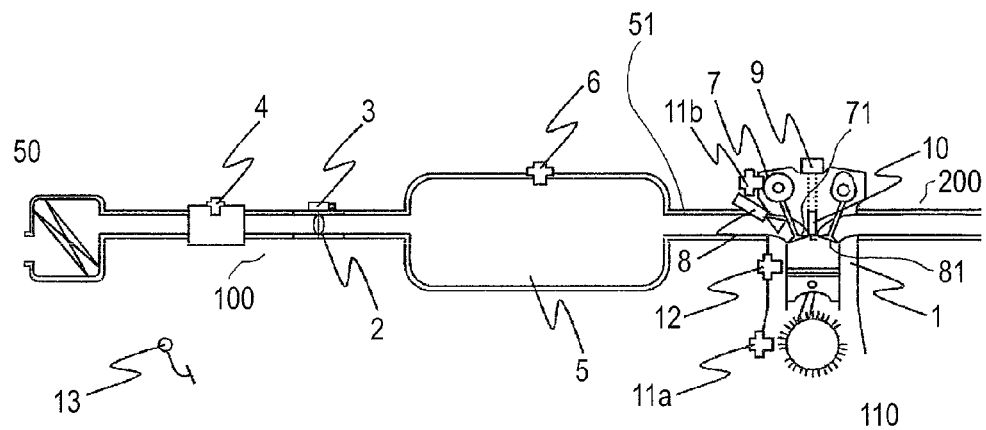
FIG. 1 is a configuration diagram that schematically shows the entire internal combustion engine to which a control device of an internal combustion engine according to a first embodiment of the present invention is applied.

Hereinafter, a knock control device of an internal combustion engine according to a first embodiment of the present invention will be described in detail with reference to the drawings. FIG. 1 is a configuration diagram that schematically shows an internal combustion engine to which a knock control device of an internal combustion engine according to the first embodiment of the present invention is applied. Furthermore, an internal combustion engine for a vehicle such as an automobile generally includes a plurality of cylinders and pistons, but FIG. 1 shows only one cylinder and piston for convenience of explanation.

In FIG. 1, an air filter 50 is provided at an upstream side of an intake system 100 of an internal combustion engine 1, and a surge tank 5, which stores air sucked via the air filter 50, is provided at a downstream side thereof. The surge tank 5 is connected to a plurality of cylinders of the internal combustion engine 1 via an intake manifold 51.

An electronic control type throttle valve 2 provided at the upstream side of the surge tank 5 is configured such that an opening degree thereof is electronically controlled to adjust a suction air flow rate of the intake system 100. An air flow sensor 4 provided at the upstream side of the electronic control type throttle valve 2 measures the suction air flow rate in the intake system 100 and outputs a suction air volume signal corresponding to the measurement value thereof.

A throttle opening degree sensor 3 measures the opening degree of the electronic control type throttle valve 2, and outputs the throttle valve opening degree signal corresponding to the measurement value. Furthermore, a mechanical throttle valve directly connected to an accelerator pedal (not shown) by a wire may be used instead of the electronic control type throttle valve 2.

An intake manifold pressure sensor (hereinafter, simply, referred to as an in-mani pressure sensor) 6 provided in the surge tank 5 measures the intake pressure in the surge tank 5, and thus, the intake pressure in the intake manifold 51, and outputs an intake manifold pressure signal (hereinafter, simply, referred to as an in-mani pressure signal) corresponding to the measurement value. Furthermore, in the first embodiment, both the air flow sensor 4 and the in-mani pressure sensor 6 are provided, however only one of them may be provided.

In an intake port of the downstream of the surge tank 5, an electronic control type VVA (Variable Valve Actuator) 7 is provided, whereby one or more variable controls among an open and close timing, an operation angle, and a lift amount of the intake valve are possible. Furthermore, an injector for injecting fuel is provided in the intake port. Furthermore, the injector 8 may be provided such that it can directly inject fuel into the cylinder of the internal combustion engine 1.

Furthermore, in the internal combustion engine 1, an injection coil 9 and an injection plug 10 for igniting the gaseous mixture in the cylinder, a crank angle sensor 11a and a cam angle sensor 11b for detecting an edge of a plate 110 provided in a crank shaft and a cam shaft so as to detect a rotational speed or a crank angle of the internal combustion engine 1, and a knock sensor 12 for detecting the vibration of the cylinder block of the internal combustion engine 1 are provided, respectively. An accelerator opening degree sensor 13 is attached to an accelerator provided at the foot of a driver's seat of a vehicle, and the accelerator opening degree sensor 13 is electrically connected to the electronic control type throttle valve 2 via an electronic control unit described later.

Figure 2:
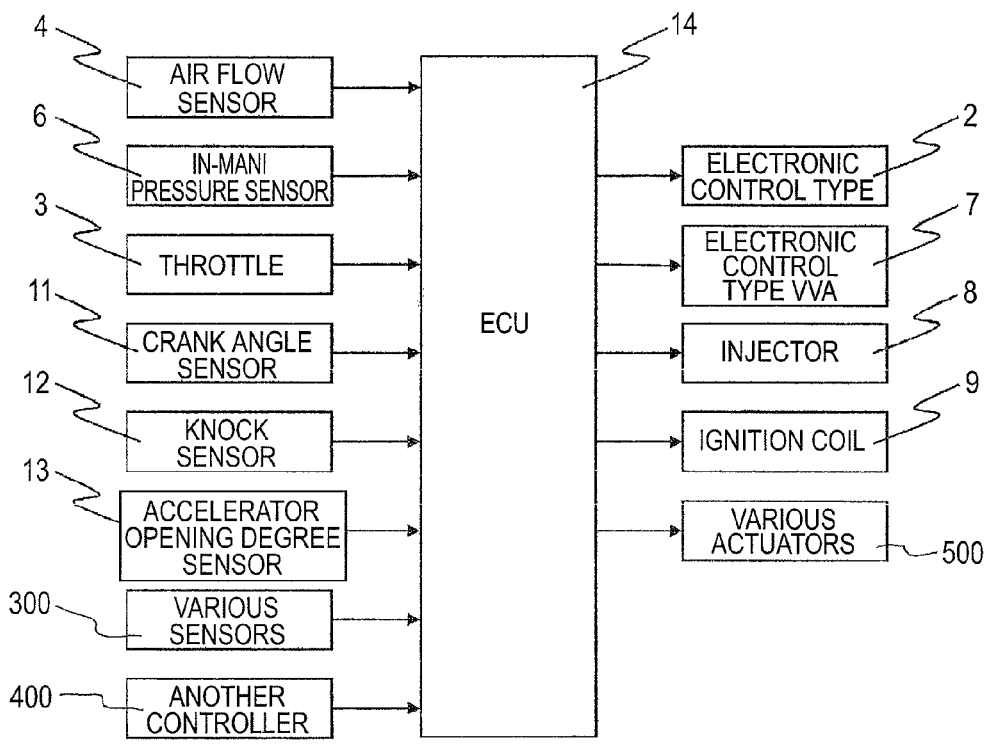
FIG. 2 is a block diagram that schematically shows a control portion of the internal combustion engine to which the control device of the internal combustion engine according to the first embodiment of the present invention is applied.

FIG. 2 is a block diagram that schematically shows a control portion of an internal combustion engine to which the control device of the internal combustion engine according to the first embodiment of the present invention is applied. In FIG. 2, the suction air flow rate measured by the air flow sensor 4, the in-mani pressure measured by the in-mani pressure sensor 6, the opening degree of the electronic control type throttle valve 2 measured by the throttle opening degree sensor 3, the pulse that is output from the crank angle sensor 11a and the cam angle sensor 11b and is synchronized with the edge of the plate provided in the crank shaft and the cam shaft, the vibration wave form of the internal combustion engine measured by the knock sensor 12, and the accelerator opening degree measured by the accelerator opening degree sensor 13 are input into an electronic control unit (hereinafter, referred to as "ECU") 14.

Furthermore, the measurement value is input from various sensors 300 other than above into the ECU 14, and signals from other controllers (for example, a control system such as an automatic transmission control, a brake control and a traction control) 400 are also input into the ECU 14. In the ECU 14, the cylinder information of the internal combustion engine 1, the rotational speed of the internal combustion engine 1, and the timing of the processing implementation synchronized with the rotation of the internal combustion engine 1 are calculated, based on the pulse output from the crank angle sensor 11a, and the cam angle sensor 11b.

The ECU 14 calculates an objective throttle opening degree based on the operation state and the accelerator opening degree of the internal combustion engine 1 such as the intake air flow rate or the rotational speed of the internal combustion engine 1, controls the electronic control type throttle valve 2, controls the electronic control type VVA 7 depending on the operation state of the internal combustion engine 1, drives the injector 8 so as to achieve an objective air/fuel ratio, and performs the conduction control to the ignition coil 9 so as to achieve an objective ignition timing. Furthermore, the ECU 14 also calculates the indicated value to various actuators 500 other than above and controls the various actuators.

Figure 3:
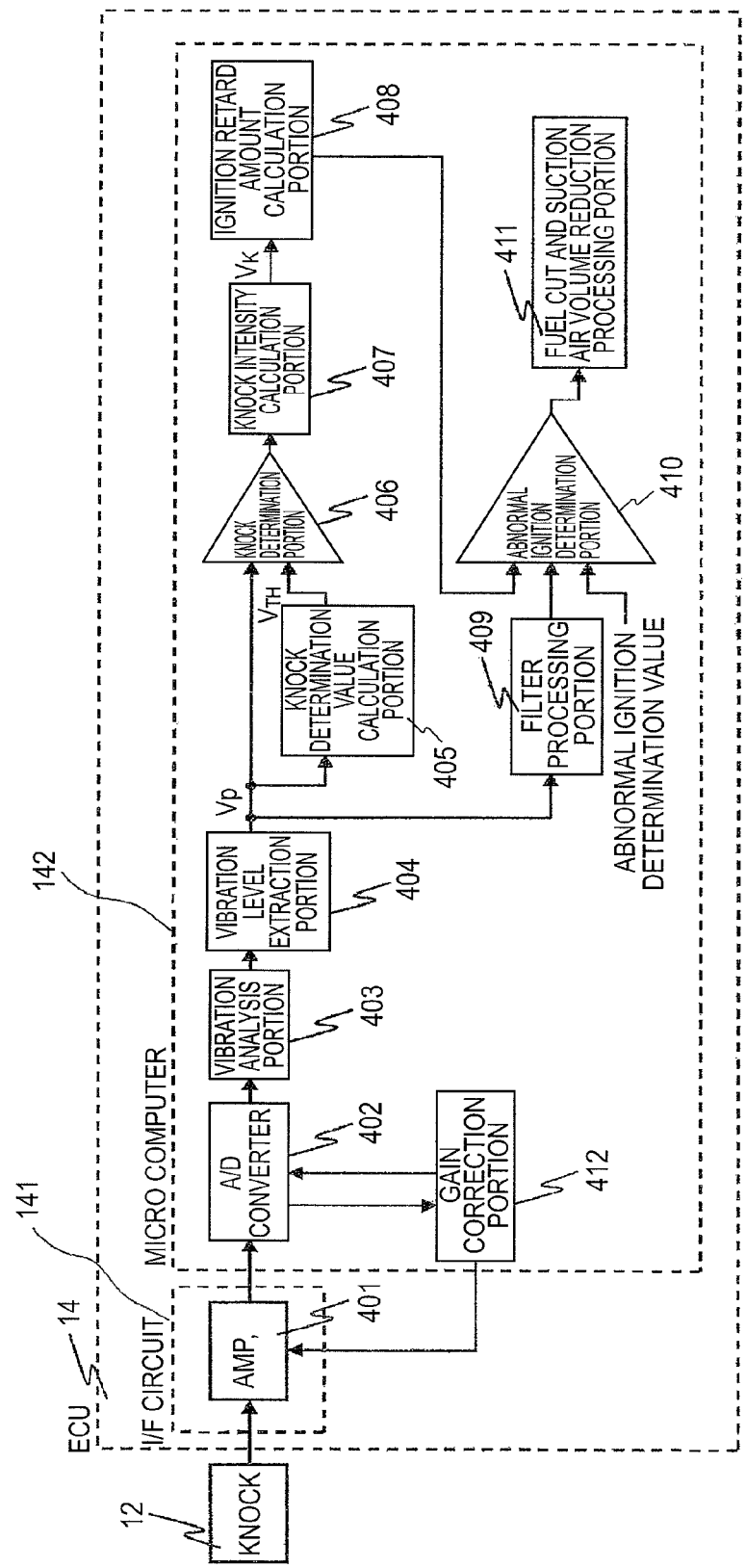
FIG. 3 is a block diagram that shows the control device of the internal combustion engine according to the first embodiment of the present invention.

FIG. 3 is a block diagram that shows a control device of the internal combustion engine according to the first embodiment of the present invention. In FIG. 3, the knock sensor 12 and the ECU 14 correspond to the knock sensor 12 and the ECU 14 shown in FIGS. 1 and 2. The ECU 14 includes various I/F circuits 141, and a micro computer 142. The micro computer 142 is constituted by an A/D converter that converts an analog signal to a digital signal, a ROM region where a control program or a control constant is stored, a RAM region where variables when executing the program are stored or the like.

The various I/F circuits 141 include a knock control I/F circuit 401. The knock control I/F control circuit 401 is constituted by a low pass filter (LPF) for removing a high frequency component of the signal output of the knock sensor 12 and an amplifier (AMP) that performs a gain correction of the signal output level of the knock sensor 12.

The microcomputer 142 includes an A/D conversion portion 402, a gain correction portion 412, a vibration analysis portion 403, a vibration level extraction portion 404, a knock determination value calculation portion 405, a knock determination portion 406, a knock intensity calculation portion 407, an ignition retard amount calculation portion 408, a filter processing portion 409, an abnormal ignition determination portion 410, and a fuel cut and suction air volume reduction processing portion 411. The A/D conversion portion 402, the gain correction portion 412, the vibration analysis portion 403, and the vibration level extraction portion 404 constitute a vibration level calculation portion as a common portion, and the filter processing portion 409, the abnormal ignition determination portion 410, and the fuel cut and suction air volume reduction processing portion 411 constitute an abnormal ignition suppression control portion.

The A/D conversion portion 402 is constituted by an A/D converter of the microcomputer 142, and converts the analog signal from the I/F circuit 401 to the digital signal for each predetermined fixed time interval, for example, 10 [μs], 20 [μs] or the like. Furthermore, the A/D conversion may be always performed, and may be performed in the period of time when an abnormal ignition or an abnormal vibration due to a knock is generated, for example, only in a window section from BTDC 10° CA to ATDC 40° CA. Furthermore, the BTDC refers to before top death center of a piston, and ATDC refers to after top death center.

The vibration analysis portion 403 performs a vibration analysis processing for performing a frequency analysis for extracting a knock-specific frequency discrete component. The processing is implemented from after the A/D conversion by the A/D conversion portion 402 is completed until a crank angle in which the rotation synchronization processing of the internal combustion engine 1 is implemented, for example, up to BTDC 80° CA. As the vibration analysis processing mentioned above, for example, a filter processing by a digital band pass filter may be used, and a spectrum analysis processing of a target frequency may be implemented by a short time furrier transform (STFT) processing. Furthermore, the analysis target frequency is not limited to a single frequency band, and two or more frequency bands may be concurrently analyzed. In the first embodiment, a case will be described where the vibration analysis processing by the spectrum analysis of the single frequency band is performed.

The vibration level extraction portion 404 performs a spectrum analysis of the output wave form of the knock sensor 12 of the window section mentioned above, for example, in the range from BTDC 10° CA to ATDC 40° CA, and calculates the vibration level based on the calculated result. Similarly to the processing in the vibration analysis portion 403, the processing in the vibration level extraction portion 404 is performed from the time period after the A/D conversion by the A/D conversion portion 402 is completed until a crank angle in which the rotation synchronization processing of the internal combustion engine 1 is implemented, for example, up to BTDC 80° CA.

FIGS. 4A to 4C are explanatory diagrams that show a spectrum analysis result in the control device of the internal combustion engine according to the first embodiment of the present invention, and show an example of a spectrum analysis result by the vibration analysis portion 403 and the vibration level extraction portion 404. In FIGS. 4A to 4C, FIG. 4A shows a spectrum in the window section when the knock is generated, FIG. 4B shows a spectrum in the window section when a knock is not generated, FIG. 4C shows the spectrum in the window section during abnormal ignition, a longitudinal axis is the spectrum, and a transverse axis is a crank angle (CA).

In FIGS. 4A, 4B, and 4C, solid lines a, b, and c are spectrum raw values of the single frequency band calculated by the short time Fourier transform, respectively. The raw value a of the spectrum when the knock is generated shown in FIG. 4A becomes a generally large value, and the raw value b of the spectrum when the knock is not generated shown in FIG. 4B becomes a generally small value. Thus, a peak value Vp of a vibrational by the knock shown in FIG. 4A can be clearly distinguished from a peak value Vp of the spectrum raw value b when the knock is not generated shown in FIG. 4B, whereby a satisfactory S/N ratio can be normally secured by using the peak value Vp of the spectrum raw value in the window section as the vibration level.

Furthermore, the spectrum raw value c when an abnormal ignition is generated shown in FIG. 4C is much greater than the spectrum raw value a when the knock is generated. For this reason, a peak value Vp of a vibration c1 due to the abnormal ignition shown in FIG. 4C can be clearly distinguished from the peak values Vp shown in FIGS. 4A and B, whereby it is possible to secure the peak value Vp when an abnormal ignition is generated, and a satisfactory S/N ratio other than (also including the knock) the abnormal ignition can be normally secured by using the peak value Vp of the spectrum raw value c in the window section as the vibration level.

When the abnormal vibration c1 due to the abnormal ignition shown in FIG. 4C is generated, there is a possibility that the amplitude of the output signal of the knock sensor 12 is great depending on the gain setting of the amplifier subjected to the gain correction in the I/F circuit 401 mentioned above, and the amplitude exceeds a digital value convertible range in the A/D conversion portion 402 as described below.

Figure 5A:
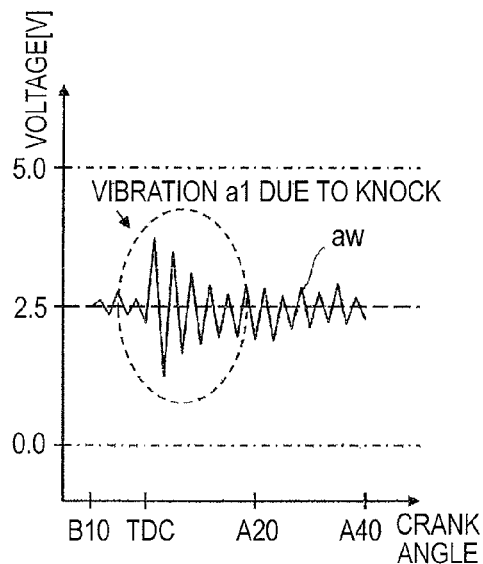
FIGS. 5A to 5D are explanatory diagrams that show a knock sensor signal in the control device of the internal combustion engine according to the first embodiment of the present invention.
Figure 5B:
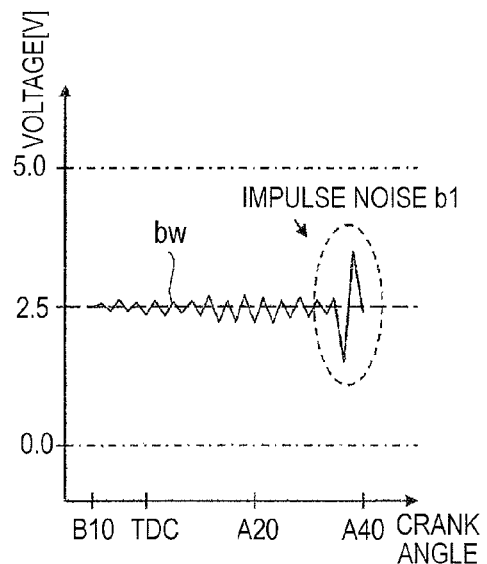
Figure 5C:
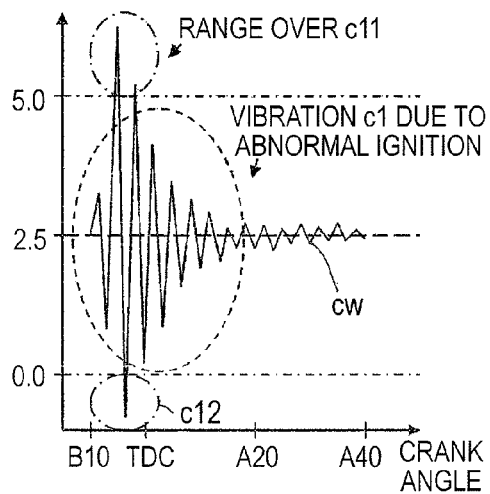
Figure 5D:
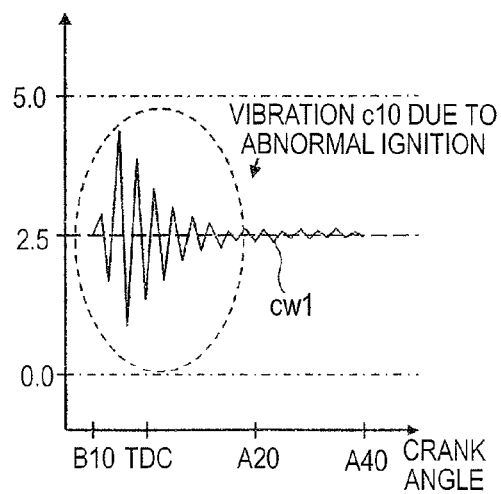

FIGS. 5A to 5D are explanatory diagrams that show a knock sensor signal in the control device of the internal combustion engine according to the first embodiment of the present invention, FIG. 5A shows a knock sensor signal (once the gain) aw, when the knock is generated, FIG. 5B shows a knock sensor signal (once the gain) bw when the knock is not generated, FIG. 5C shows a knock sensor signal (once the gain) cw when the abnormal ignition is generated, and FIG. 5D shows a knock sensor signal (0.5 times the gain) cw1 when the abnormal ignition is generated, respectively. In FIGS. 5A to 5D, the longitudinal axis thereof shows a voltage, and the transverse axis thereof shows a crank angle. In many cases, the A/D converter of the general microcomputer makes the voltage from 0 [V] to 5 [V] a digital value. Thus, FIGS. 5A to 5D show examples of the knock sensor signal to be input into the A/D conversion portion 402 in the state of being biased to 2.5 [V].

The knock sensor signal aw when the knock is generated shown in FIG. 5A has a maximum amplitude of the vibrational due to the knock in the range of 0[V] to 5[V], and the knock sensor signal bw when the knock is not generated shown in FIG. 5B has a maximum amplitude in the range of 0[V] to 5[V] even when there is an impulse noise b1, and thus it is said that the knock sensor signals have a gain setting of the suitable level, respectively. However, the knock sensor signal cw when the abnormal ignition is generated shown in FIG. 5C has a maximum amplitude of the vibration c1 due to the abnormal ignition which exceeds the range of 0[V] to 5[V], and range over portions c11 and c12 are fixed to 0 [V] or 5[V]. For that reason, there is a problem in that it is difficult to calculate a correct spectrum in the spectrum analysis of the knock sensor signal after the completion of the A/D conversion by the vibration analysis portion 403.

Figure 6:
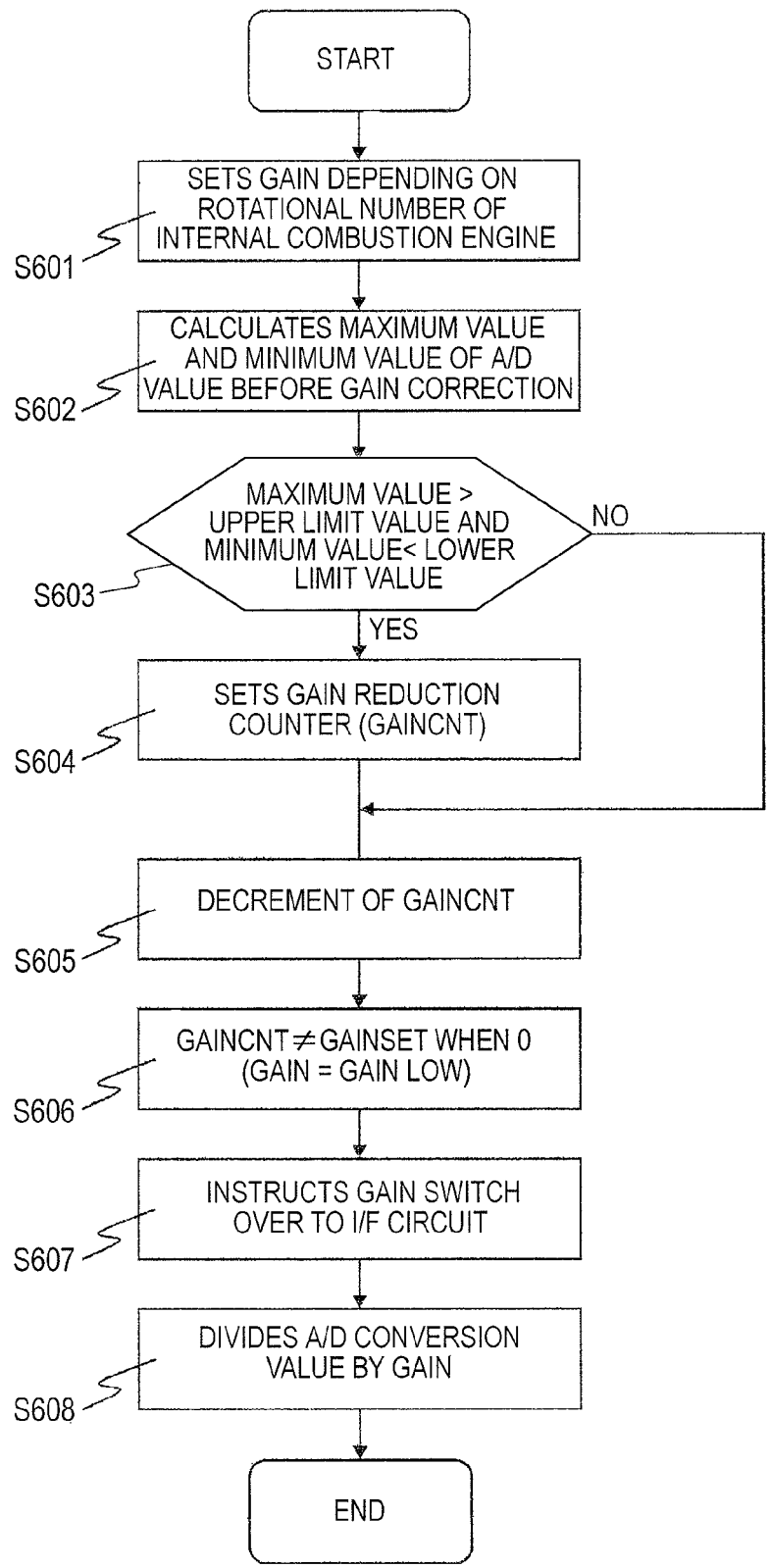
FIG. 6 is a flowchart that shows a gain correction action in the control device of the internal combustion engine according to the first embodiment of the present invention.

Thus, the gain correction of the knock sensor signal is implemented by the gain correction portion 412 mentioned above shown in FIG. 3, details of the gain correction by the gain correction portion 412 will be described later. FIG. 6 is a flowchart that shows the gain correction action in the control device of the internal combustion engine according to the first embodiment of the present invention. The processing shown in the flow chart of FIG. 6 is implemented from after the completion of the A/D conversion of the knock sensor signal by the A/D conversion portion 402 until the crank angle (for example, up to BTDC 80° CA) in which the rotation synchronization processing of the internal combustion engine 1 is implemented.

In FIG. 6, in step S601, for example, GAIN is set depending on the rotational speed of the internal combustion engine 1 as below.

Gain Setting Example

GAIN=2.0 times . . . rotational speed 2,000 [r/min] or less
GAIN=1.0 times . . . rotational speed 2,000 to 4,000 [r/min]
GAIN=0.5 times . . . rotational speed 4,000 [r/min] or more In the next step S602, a maximum value and a minimum value of the A/D conversion value of the knock sensor signal before the gain correction in the window section described above are calculated. Next, in step S603, it is determined whether or not the maximum value calculated in step 602 is equal to or greater than an upper limit value (for example, 4.9 [V]) or the minimum value is equal to or less than a lower limit value (for example, 0.1 [V]). As a consequence of the determination, when there is at least one of a case where the maximum value of the knock sensor signal after the A/D conversion before the gain correction does not exceed the upper limit value and a case where the minimum value of the knock sensor signal after the A/D conversion before the gain correction is not equal to or less than the lower limit value (NO), the process proceeds to step S605.

Meanwhile, as a consequence of the determination in step S603, if the maximum value of the knock sensor signal after the A/D conversion before the gain correction does not exceed the upper limit value, and the minimum value of the knock sensor signal after the A/D conversion before the gain correction is not equal to or less than the lower limit value (YES), the process proceeds to step S604. In step S604, a gain reduction counter (GAINCNT) (not shown) is set to, for example, about 20 strokes, the process proceeds to step S605. In step S605, is reduced to "0" for each processing period by the flow chart of FIG. 6.

In the next step S606, when the gain reduction counter (GAINCNT) is not "0", for example, the gain (GAIN) is reset as below.

Gain Setting Example

GAIN=GAINLOW (0.5 times) . . . GAINCNT≠0

In this manner, depending on the gain (GAIN) finally determined by step S606, in the next step S607, the I/F circuit 401 is instructed to perform the gain conversion, and the process proceeds to step S608. In step S608, the A/D conversion value after the gain correction is calculated by the following equation (1):

$$\text{A/D conversion value after the gain correction} = [\text{A/D conversion value}] \div [\text{gain(GAIN)}] \quad \text{equation (1)}$$

As mentioned above, when the vibration equal to or greater than a predetermined level is generated, during a predetermined time, a gain correction is implemented which reduces the gain by the gain correction portion 412. As a result, when the abnormal vibration is consecutively generated, as shown in FIG. 5D, the knock sensor signal cw1 due to the abnormal ignition after the second time can implement the A/D conversion in a suitable gain, whereby the maximum amplitude of a vibration c10 due to the abnormal ignition can be set in the range from 5[V] to 0[V].

Furthermore, as a condition that determines the gain reduction, for example, a case may be adopted where a difference between the maximum value and the minimum value of the knock sensor signal after A/D conversion is equal to or greater than a predetermined value, and a case may be adopted where a peak value within the window section is equal to or greater than a predetermined value as a result of the vibration level extraction processing in the vibration analysis portion 403 or the vibration level extraction portion 404, without being limited to the aforementioned method. Furthermore, by dividing the A/D conversion value by the gain as in step S608, in the processing after the vibration analysis portion 403 of FIG. 3, it is possible to perform the processing as a value corresponding to "1" times the gain. As described above, the vibration level calculation portion as a common portion was described which is constituted by the A/D conversion portion 402, the gain correction portion 412, the vibration analysis portion 403, and the vibration level extraction portion 404.

Next, a knock control portion will be described which is constituted by the knock determination calculation portion 405, the knock determination portion 406, the knock intensity calculation portion 407, and the ignition retard amount calculation portion 408. The processing by the knock control portion is implemented for each crank angle (for example, BTDC 80° CA) in which the rotation synchronization processing of the internal combustion engine 1 is implemented. The vibration levels Vp for the knock control calculated in the vibration level extraction portion 404 are averaged by performing the filter processing, firstly, by the following equation (2) using the knock determination calculation by the knock determination value calculation portion 405.

$$VBGL(n) = K \times VBGL(n-1) + (1-K) \times Vp(n) \quad \text{equation (2)}$$

Herein, VBGL(n): filter value, Vp(n): vibration level, K: filter coefficient, n: current stroke, and n−1: previous stroke Next, a knock determination value VTH(n) for the knock determination is obtained by the following equation (3).

$$VTH(n) = \min\{VBGL(n) \times Kth + Vofs, VTH\max\} \quad \text{equation (3)}$$

Herein, Kth: knock determination value coefficient, Vofs: knock determination value offset, and VTHmax: knock determination value upper limit value.

Furthermore, as a calculation of the knock determination value, assuming that irregularity of the vibration levels is a normal distribution, the following equation (4) may be computed.

$$VTH(n) = \min\{VBGL(n) + Kth \times Vsigma(n), VTH\max\} \quad \text{equation (4)}$$

Herein, Vsigma(n): standard deviation of vibration level, and Kth: knock determination value coefficient (for example, "3").

Next, in the knock determination portion 406, the vibration level Vp is compared to the knock determination value VTH, and when the vibration level Vp is equal to or greater than the knock determination value VTH, the knock occurrence is determined. In next knock intensity calculation portion 407, the knock intensity is calculated which is the signal depending on force of the knock by the following equation (5):

$$VK(n) = \max\{Vp(n) - VTH(n), 0\} / VTH(n) \qquad \text{equation (5)}$$

Herein, VK(n): knock intensity
(the knock existence is determined when VK(n)>0)

In the ignition retard amount calculation portion 408, the retard correction amount is calculated, but, firstly, the retard correction amount depending on the knock intensity for each ignition is calculated by the following equation (6):

$$\Delta\theta R(n) = -VK(n) \times Kg \qquad \text{equation (6)}$$

Herein, $\Delta\theta R(n)$: retard amount for each ignition [deg CA BTDC], and Kg: retard amount reflection coefficient (Kg>0).

Next, in the ignition retard amount calculation portion 408, the retard amount for each ignition is integrated, and the knock correction amount of the ignition timing is calculated. However, when the knock is not generated, an advance return is performed, and the retard correction amount is calculated. This is calculated by the following equation (7).

$$\theta R(n) = \min\{\max\{\theta R(n-1) + \Delta\theta R(n) + Ka, \theta R\max\}, 0\} \qquad \text{equation (7)}$$

Herein, $\theta R(n)$: retard correction amount [deg CA BTDC], Ka: advance return constant, and $\theta R\max$: maximum retard correction amount [deg CA BTDC]

The ignition timing is corrected using the retard correction amount $\theta R(n)$ calculated by the equation (7). Furthermore, in the retard correction amount $\theta R(n)$, an advance direction is set to be positive. As mentioned above, the processing method is described which retards the ignition timing during knock detection and realizes the knock control suppressing the knock.

Next, the abnormal ignition suppression control portion will be described which includes the filter processing portion 409, the abnormal ignition determination portion 410, and the fuel cut and intake air volume reduction processing portion 411. The abnormal ignition suppression processing by the abnormal ignition suppression control portion is also implemented for each crank angle (for example, BTDC 80° CA) in which the rotation synchronization processing of the internal combustion engine 1 is implemented.

Figure 7:
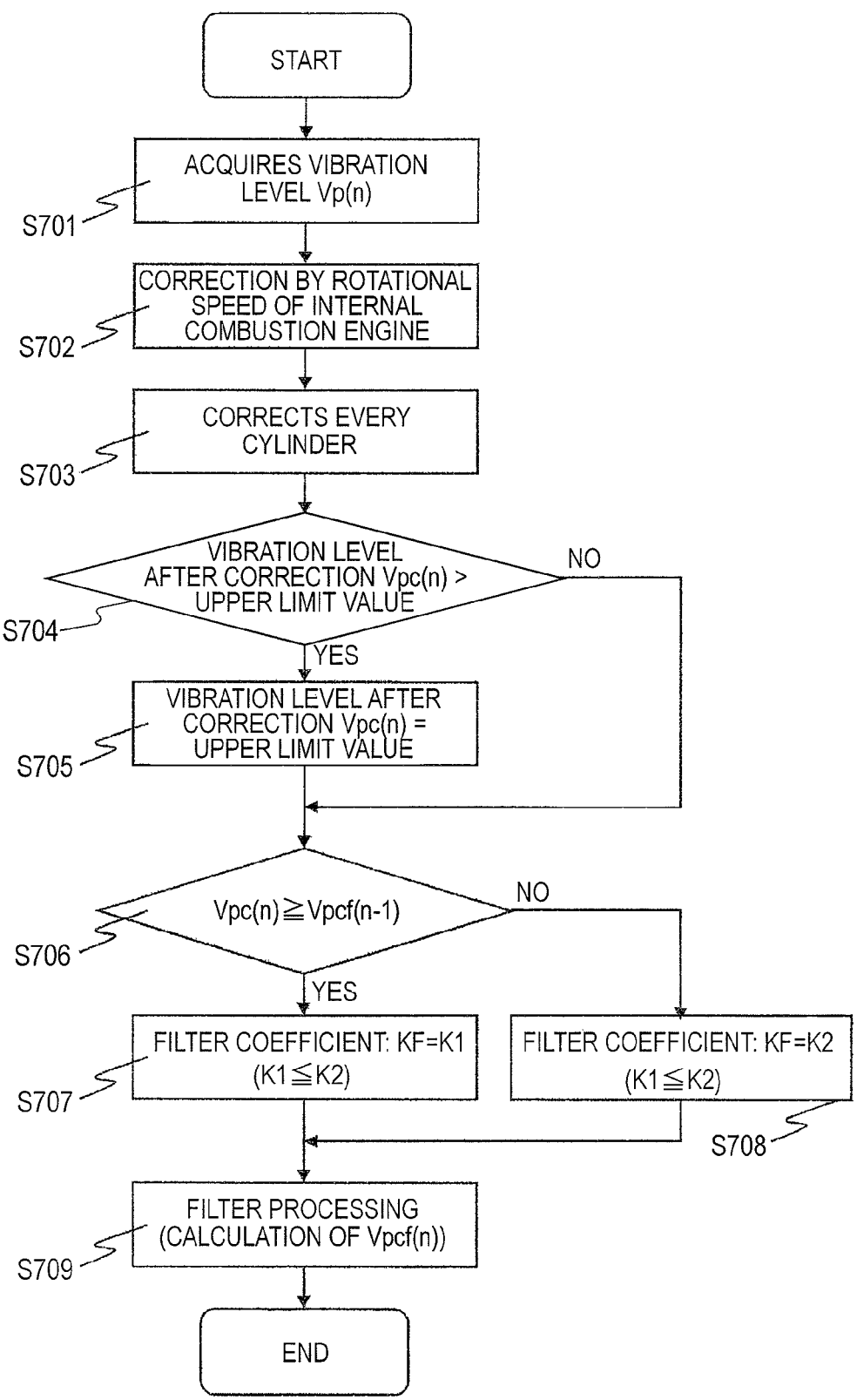
FIG. 7 is a flow chart that shows a filter processing action in the control device of the internal combustion engine according to the first embodiment of the present invention.

The vibration level Vp calculated by the vibration level extraction portion 404 is subjected to the filter processing in the filter processing portion 409, the details of the filter processing will be described below. FIG. 7 is a flow chart that shows a filter processing operation in the control device of the internal combustion engine according to the first embodiment of the present invention. In FIG. 7, in step S701, firstly, a vibration level Vp(n) of the current stroke used in the subsequent processing is acquired. In the next steps S702 and S703, in regard to the vibration level Vp(n), the correction based on the rotational speed of the internal combustion engine 1 and the correction for each cylinder are implemented.

FIGS. 8A and 8B are explanatory diagrams that show a correction amount of the vibration level Vp(n) based on the rotational speed of the internal combustion engine, and a correction amount of the corresponding vibration level Vp(n) for each cylinder, in the control device of the internal combustion engine according to the first embodiment of the present invention, FIG. 8A shows the correction amount corresponding to the rotational speed of the internal combustion engine and FIG. 8B shows the correction amount for each cylinder. The correction of the vibration level Vp(n) based on the rotational speed of the internal combustion engine 1 according to step S702 of FIG. 7 is implemented by storing the correction value in a table searched and interpolated based on the rotational speed of the internal combustion engine 1 shown in FIG. 8A and multiplying the correction amount searched, interpolated and calculated from the table based on the current rotational speed of the internal combustion engine 1 by the vibration level Vp(n).

As the correction value of the vibration level Vp(n) mentioned above, as shown in FIG. 8A, for example, based on the maximum value of the vibration level during abnormal ignition generated when the rotational speed of the internal combustion engine 1 is about 3,000 to 4,000 [r/min], when the maximum value of the vibration level during abnormal ignition in the low rotation side is low, for example, the correction of about 1.2 to 1.5 times may be implemented, and when an allowance between the maximum value of the vibration level during normal combustion and knock in the high rotation side and an abnormal ignition determination value described below is low, for example, the correction of about 0.8 to 0.9 times may be implemented.

Furthermore, as shown in FIG. 8B, the correction for each cylinder is implemented by storing the correction value in a table searched based on the cylinder information and multiplying the correction amount searched and calculated from the table based on the current cylinder information by the vibration level Vp(n). As the correction value for each cylinder, for example, when a knock sensor is attached between a second cylinder and a third cylinder in a 4 cylinder internal combustion engine and, in a case where the maximum value of the vibration level during abnormal ignition generated in a first cylinder and a fourth cylinder is smaller than the maximum value of the vibration level during abnormal ignition generated in the second cylinder and the third cylinder, for example, by implementing the correction of about 1.2 times, an inter-cylinder difference can be corrected. In this manner, the vibration level Vpc(n) after the correction is calculated.

Furthermore, the correction for each cylinder may be implemented in regard to the vibration level Vp (n) described above, and may be implemented by separately setting the abnormal ignition determination value described below.

In FIG. 7, in the next step S704, the vibration level Vpc(n) after the correction is compared to the upper limit value of the vibration level. When the vibration level Vpc(n) after the correction is higher than the upper limit value, in step S705, the upper limit value is substituted for the vibration level Vpc(n) after the correction, and the process proceeds to step S706. When the vibration level Vpc(n) after the correction is smaller than the upper limit value, the process proceeds to step S706 without doing anything.

Next, in step S706, the vibration level Vpc(n) after the correction is compared to the previous stroke value Vpcf(n−1) of the vibration level after the filter subsequent correction described below. Herein, when the vibration level Vpc(n) after the correction is equal to or greater than the vibration level Vpcf(n−1) after the previous filter subsequent correction (Yes), K1 is substituted for the filter coefficient KF in step S707, and when the vibration level Vpc(n) after the correction is smaller than the vibration level Vpcf(n−1) after the previous filter subsequent correction (No), K2 is substituted for the filter coefficient KF in step S708.

In the next step S709, the filter processing is implemented by the following equation (8):

$$Vpcf(n) = KF \times Vpcf(n-1) + (1-KF) \times Vpc(n) \qquad \text{equation (8)}$$

Herein, Vpcf(n): the vibration level after the filter subsequent correction, Vpc(n): the vibration level after the correction, and KF: filter coefficient Herein, a time constant $\tau$ of the filter processing indicated in equation (8) is indicated by the following equation (9):

$$\tau = -\Delta t / \ln(KF) \qquad \text{equation (9)}$$

Herein, Δt: processing period, and ln: natural logarithm

When the processing period Δt is constant, when the filter coefficients satisfy K1≤K2, the time constant τ of the filter processing satisfies τ1≤τ2 (τ1 and τ2 are time constants calculated from the filter coefficients K1 and K2, respectively). That is, when the filter coefficients satisfy K1≤K2, the filter coefficient K1 selected in step S707 has a reflection ratio of the vibration level in the current stroke higher than the case of the filter coefficient K2 selected in step S708 (the time constant in the filter processing is reduced).

Figure 9A:
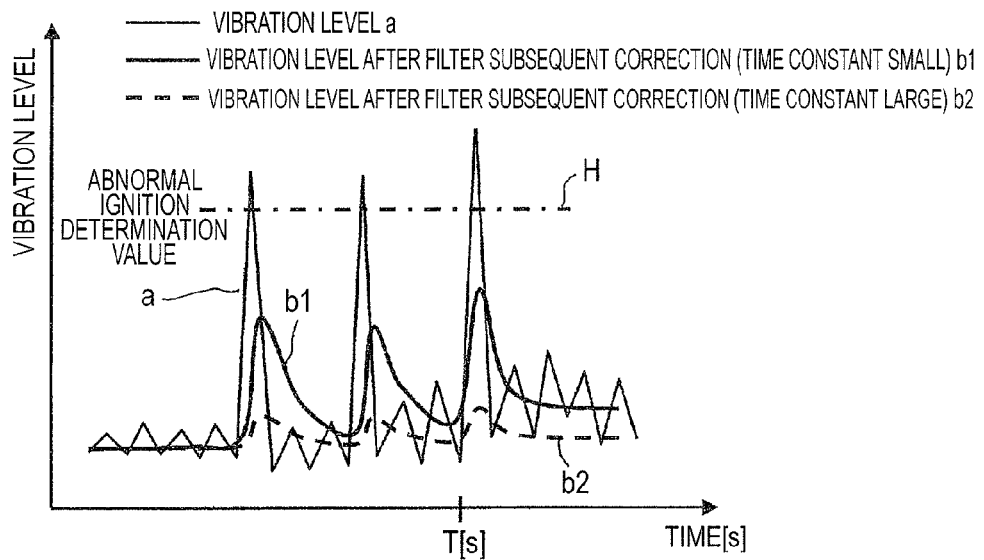
FIGS. 9A and 9B are explanatory diagrams that show an action after a filter processing in the control device of the internal combustion engine according to the first embodiment of the present invention.
Figure 9B:
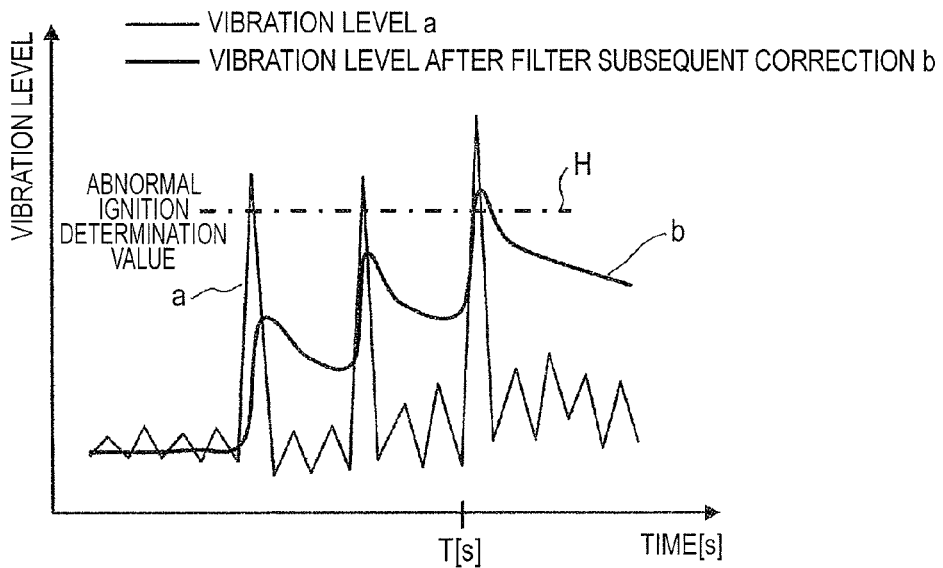

FIG. 9 is an explanatory diagram that shows an operation after filter processing in the control device of the internal combustion engine according to the first embodiment of the present invention, FIG. 9A shows a case where the filter coefficient is not switched over, FIG. 9B shows a case where the filter coefficient is switched over, a longitudinal axis shows a vibration level, and a transverse axis shows a time. When the strong vibration is intermittently generated and the vibration level a intermittently appears as shown, in a case where the filter coefficient is not switched over in FIG. 9A, there is a rapid decline in the vibration level b1 after filter subsequent correction of the case of a low time constant, and there is a small increase in the vibration level b2 after the filter subsequent correction of the case of a high time constant. Thus, the vibration levels b1 and b2 after the filter subsequent correction tend not to reach the abnormal ignition determination value H. However, when the filter coefficient is switched over in FIG. 9B, it is possible to make the adherence to the vibration level b after the filter subsequent correction to the ascending side fast and make the adherence to the vibration level b after the filter subsequent correction to the descending side slow. Thus, it is possible to operate so as to cause the vibration level b after the filter subsequent correction to reach the abnormal ignition determination value H depending on the magnitude and the frequency of vibration. In this manner, the filter processing in the filter processing portion 409 of FIG. 3 is implemented.

Next, in the abnormal ignition determination portion 410 of FIG. 3, the ignition retard amount is compared to the abnormal ignition determination implementation retard amount, and the vibration level Vpcf(n) after the filter subsequent correction is compared to the abnormal ignition determination value H. When the ignition retard amount is retarded so as to be equal to or greater than the abnormal ignition determination implementation retard amount, and the vibration level Vpcf(n) after the filter subsequent correction is equal to or greater than the abnormal ignition determination value H, the abnormal ignition is determined.

Figure 10A:
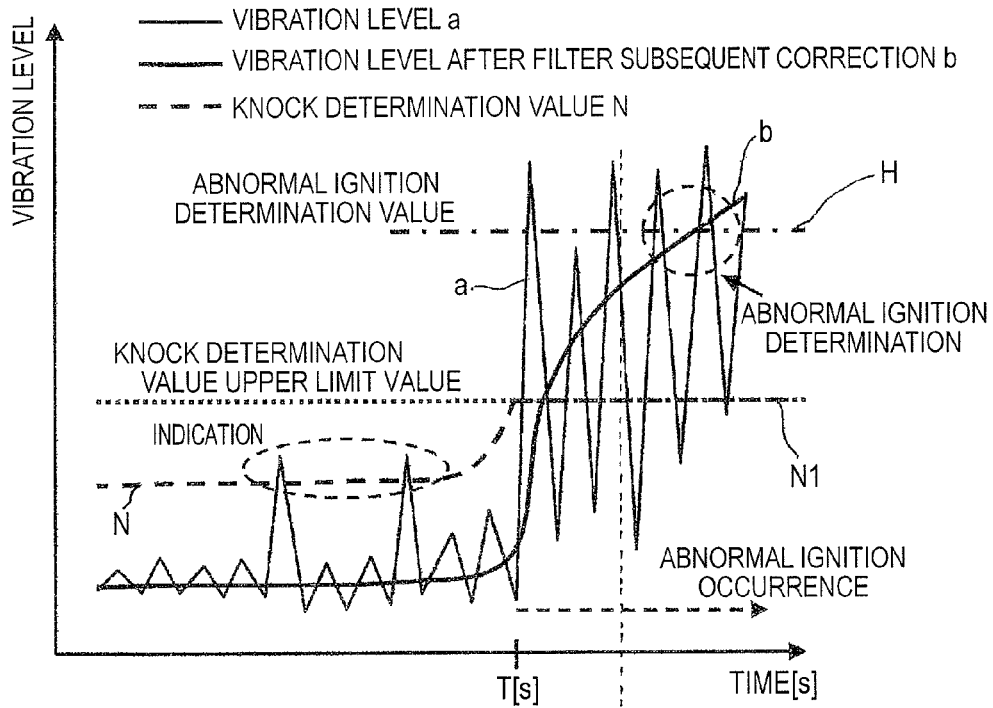
FIGS. 10A and 10B are explanatory diagrams that show a vibration level and a retard correction amount in the control device of the internal combustion engine according to the first embodiment of the present invention.
Figure 10B:
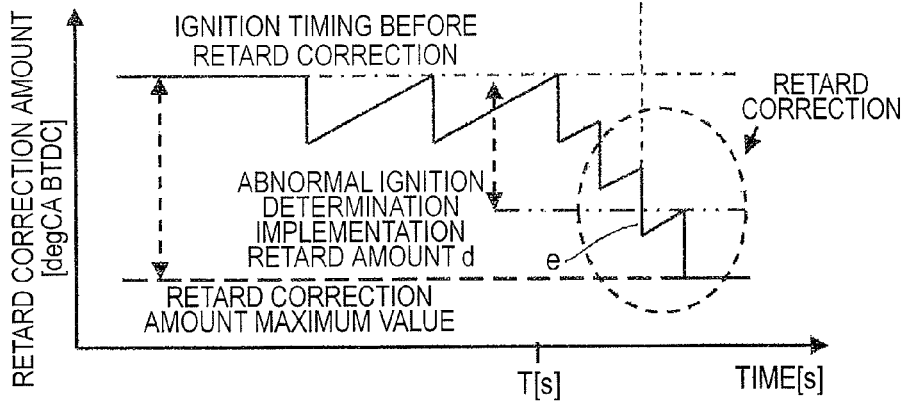

FIGS. 10A and 10B are explanatory diagrams that show the vibration level and the retard correction amount in the control device of the internal combustion engine according to the first embodiment of the present invention. FIG. 10A shows the vibration level a, the knock determination value N, and the behavior of the vibration level b after the filter subsequent correction when the abnormal ignition is determined. The longitudinal axis thereof shows the vibration level, and the transverse axis thereof shows the time. FIG. 10B shows the behavior of the ignition timing, the longitudinal axis thereof is the retard amount, and the transverse axis thereof is the time. Before the abnormal ignition is generated, as shown in FIG. 10A by the wave form to the time T[s], the knock of a relatively large vibration level a that can be an indication thereof is generated, and accordingly, the ignition timing is subjected to the retard correction as shown in FIG. 10B.

However, when the abnormal ignition is generated, as after the time T[s] shown in FIG. 10A, the vibration level a is increased at once, and in response, as shown in FIG. 10B, the ignition retard amount e is retarded by the abnormal ignition determination implementation retard amount d or more. When Vpcf(n) shown by the vibration level after the filter subsequent correction b exceeds the abnormal ignition determination value H, the abnormal ignition occurrence is determined.

Herein, since the abnormal ignition is generated regardless of the ignition timing, there is a need to sufficiently perform the retard correction of the ignition timing before determining the abnormal ignition. Otherwise, there is concern that the knock controllable by the ignition timing is erroneously determined as the abnormal ignition. Thus, in order to sufficiently perform the retard correction of the ignition timing before determining the abnormal ignition, by setting the knock determination value upper limit value N1 as a value smaller than the abnormal ignition determination value H, the ignition timing is necessarily retarded when the abnormal ignition is generated, and since it is determined whether or not the ignition retard amount is sufficiently retarded, such an erroneous detection can be prevented.

Next, in the fuel cut and suction air volume reduction processing portion 411 of FIG. 3, when the abnormal ignition is determined, the abnormal ignition suppression control by the fuel cut and suction air volume reduction is implemented. When the abnormal ignition is generated, in order to suppress the same, it is effective to lower the temperature in the cylinder. Thus, as a method of lowering the temperature in the cylinder, it is effective to lower the load of the internal combustion engine 1 by the reduction of the suction air volume to promote the reduction of the temperature in the cylinder or forcibly scavenge the cylinder by performing the fuel cut between some strokes to lower the temperature in the cylinder. By using such methods in combination, the suppression control of the abnormal ignition can be rapidly implemented.

Second Embodiment

Next, a control device of an internal combustion engine according to a second embodiment of the present invention will be described. The control device of the internal combustion engine of the present embodiment is substantially the same as that of the first embodiment, and thus, the processing in the vibration analysis portion 403 and the vibration level extraction portion 404 of FIG. 3 having a clear difference will be mainly described.

Figure 11:
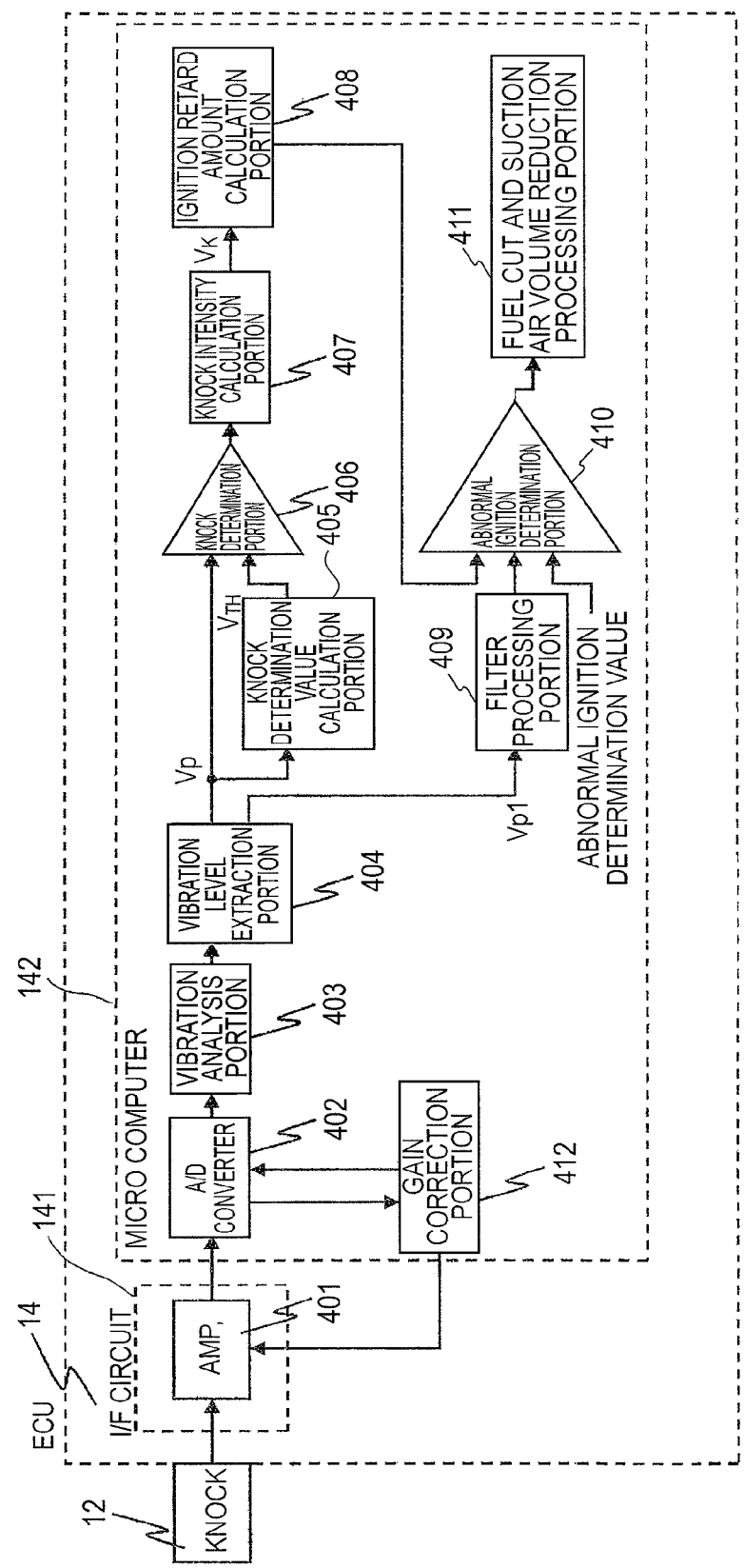
FIG. 11 is a block diagram that shows a knock control portion and an abnormal ignition control portion in a control device of an internal combustion engine according to a second embodiment of the present invention.

FIG. 11 is a block diagram that shows a knock control portion and an abnormal ignition control portion in the control device of the internal combustion engine according to the second embodiment of the present invention. In the vibration analysis portion 403 and the vibration level extraction portion 404 shown in FIG. 3 in the first embodiment mentioned above, the vibration level was calculated based on the result of the spectrum analysis and the calculation of the knock sensor wave form in the window section (for example, from BTDC 10° C. CA to ATDC 40° CA) mentioned above. However, in the second embodiment, as shown in FIG. 11, it is characterized in that the vibration level calculated in the vibration level extraction portion 404 is separately calculated into a knock control vibration level Vp and an abnormal ignition suppression control vibration level Vp1.

FIGS. 12A to 12C are explanatory diagrams that show a spectrum analysis result in the control device of the internal combustion engine according to the second embodiment of the present invention, and show an example of the spectrum analysis result by the vibration analysis portion 403 and the vibration level extraction portion 404. FIG. 12A shows a spectrum when a knock is generated, FIG. 12B shows a spectrum when a knock is not generated, and FIG. 12C shows a spectrum when an abnormal ignition is generated. In FIGS. 12A to 12C, a longitudinal axis shows a spectrum and a transverse axis shows a crank angle.

In FIGS. 12A to 12C, thin solid lines a are spectrum raw values of a single frequency band calculated by the short time Fourier transform. The spectrum raw values a shown by the thin solid lines generally show large values in the spectrum when the knock is generated shown in FIG. 12A, and the spectrum raw values b generally show small values in the spectrum when the knock is not generated shown in FIG. 12B. However, for example, when impulsive noises b1 such as the electric noise are piled up, in some cases, the spectrum of the same level during knocking is generated as shown in FIG. 12B.

For that reason, when using the peak value Vp1 of the spectrum raw value a as the vibration level, commonly, a satisfactory S/N ratio is shown during knocking and during normal combustion, but when the noise component is increased during noise piling up shown in FIG. 12B, and the S/N ratio is lowered. Furthermore, in the overall average value R of the spectrum in the knock detection window, the noise component is suppressed to a lower level during noise filing up shown in FIG. 12B, the satisfactory S/N ratio is shown during knocking and normal combustion, but, when the attenuation of the knock vibration is rapid as shown in FIG. 12A, the signal component is decreased and the S/N ratio is lowered.

Thus, as shown by thick solid lines f of FIGS. 12A and 12B, when using the movement average subsequent peak value Vpo of the spectrum in the knock detection window, an increase in spectrum is suppressed even if the impulse noises b1 shown in FIG. 12B are piled up, and a decline in spectrum is suppressed even during knocking as shown in FIG. 12A. Thus, it is possible to secure the satisfactory S/N ratio during knocking and during normal combustion in more operation states.

Furthermore, as shown in FIG. 12C, the spectrum raw value during abnormal ignition occurrence is sufficiently larger than the spectrum during knocking shown in FIG. 12A. In the detection of the abnormal ignition, since the signal component during abnormal ignition is not reduced, it is possible to secure the satisfactory S/N ratio of the abnormal ignition and other than the abnormal ignition (also including the knock) by the use of the peak value Vp1 of the spectrum raw value.

The above is an example which uses the common window section for the purpose of knock control and for the purpose of abnormal ignition suppression control, but a method of separately setting the respective window sections can also be considered. For example, in FIG. 12, as the knock detection window, for example, the movement average subsequent peak value Vp from TDC to ATDC 20° CA includes the peak value due to the knock vibration in FIG. 12A, but it is possible that the movement average subsequent peak value Vp does not include the peak value due to the impulse noise b1 of FIG. 12B.

Furthermore, as the abnormal ignition detection window, the peak value Vp1 of the spectrum raw value from BTDC 10° CA to ATDC 40° CA includes the impulse noise B1 shown in FIG. 12B but can detect the vibration c1 due to the abnormal ignition of FIG. 12C without omission. However, since the knock vibration shown in FIG. 12A and the impulse noise b1 shown in FIG. 12B are also sufficiently smaller than the vibration due to the abnormal ignition shown in FIG. 12C, an effect of the abnormal ignition on the detectabilty is small.

In this manner, the second embodiment is characterized in that, the movement average subsequent peak value within the knock detection window section (for example, from TDC to ATDC 20° CA) is used in the knock control vibration level Vp used in the knock determination value calculation portion 405 in FIG. 11 and the knock determination portion 406, and the peak value of the spectrum raw value within the abnormal ignition detection window section (for example, from BTDC 10° CA to ATDC 40° CA) is used as the abnormal ignition suppression control vibration level Vp1 used in the filter processing portion 409 of FIG. 11, whereby the detectability of each abnormal combustion can be further improved.

The control devices of the internal combustion engines according to the first and second embodiments of the present invention, mentioned above, include the following characteristics:

(1) The control device of the internal combustion engine according to the present invention has an operation state detecting portion that detects an operation state of the internal combustion engine; a combustion control portion that controls a combustion state of the internal combustion engine depending on the detected operation state of the internal combustion engine; a vibration sensor that is attached to a cylinder block of the internal combustion engine to detect the vibration of the internal combustion engine; a vibration level extraction portion that extracts a vibration level of a predetermined frequency range in the vibration detected by the vibration sensor within a predetermined crank angle range of the internal combustion engine; and a knock control portion which compares the extracted vibration level to a knock determination value, when it is determined that the vibration level is equal to or greater than the knock determination value, determines that a knock is generated in the internal combustion engine, performs a retard correction of an ignition timing of the internal combustion engine, and suppresses the knock, wherein the control device of the internal combustion engine includes a filter processing portion that performs a filter processing on the vibration level extracted by the vibration level extraction portion and calculates the vibration level after the filter processing; and an abnormal ignition suppression control portion which compares the vibration level after the filter processing to the abnormal ignition determination value when the retard correction equal to or greater than a predetermined value is performed by the knock control portion, in a case where it is determined that the vibration level after the filter processing is equal to or greater than the abnormal ignition determination value, determines that the abnormal ignition is generated in the internal combustion engine, corrects and controls the combustion control portion in a direction of suppressing the abnormal ignition.

According to the control device of the internal combustion engine according to the present invention configured in this manner, there is an excellent effect of distinguishing the knock and the abnormal ignition (pre-ignition and post-ignition) based on the output of the knock sensor and being capable of suppressing and controlling by a method suitable for each abnormal combustion.

(2) Furthermore, the control device of the internal combustion engine according to the present invention is characterized in that the knock determination value is set as a value smaller than the abnormal ignition determination value.

According to the control device of the internal combustion engine according to the present invention configured as above, since the knock determination value is set as a value smaller than the abnormal ignition determination value, the ignition timing is firstly subjected to the retard correction by the knock control. However, nevertheless, when the abnormal vibration continues and the abnormal vibration of the level in which the filter subsequent vibration level exceeds the knock determination value is generated, it is possible to determine the abnormal ignition to execute the suppression control of the abnormal ignition.

(3) Furthermore, the control device of the internal combustion engine according to the present invention is characterized in that the filter processing portion switches over the filter coefficient such that, when the vibration level in the current stroke in an action stroke of the internal combustion engine is equal to or greater than the vibration level after the filter processing in the previous stroke, a reflection ratio of the vibration level in the current stroke is increased as compared to when the vibration level in the current stroke is smaller than the vibration level after the filter processing in the previous stroke.

According to the control device of the internal combustion engine according to the present invention configured as above, since the attenuation ratio of the filter subsequent vibration level can be lowered even when the frequency of the abnormal vibration is low, it is possible to detect the abnormal ignition even when the abnormal vibration of a high level is generated less frequently.

(4) The control device of the internal combustion engine according to the present invention is characterized in that the filter processing portion limits the vibration level, at which the filter processing is implemented, by an upper limit value.

According to the control device of the internal combustion engine according to the present invention configured as above, when an abnormal vibration of a high level is suddenly generated, the erroneous determination of the abnormal ignition can be prevented.

(5) Furthermore, the control device of the internal combustion engine according to the present invention is characterized in that the filter processing portion corrects the vibration level, at which the filter processing is implemented, depending on the rotational speed of the internal combustion engine.

According to the control device of the internal combustion engine according to the present invention configured as above, it is possible to correct a difference between vibration levels due to the rotational speed of the internal combustion engine, whereby the erroneous detection of the abnormal ignition can be prevented even when the rotational speed is changed.

(6) Furthermore, the control device of the internal combustion engine according to the present invention is characterized in that the filter processing portion includes a configuration in which the vibration level after the filter processing is calculated for each cylinder of the internal combustion engine, and the abnormal ignition determination value is set for each cylinder.

According to the control device of the internal combustion engine according to the present invention configured as above, a difference of the vibration levels between the cylinders can be corrected.

(7) Furthermore, the control device of the internal combustion engine according to the present invention is characterized in that the filter processing portion includes a configuration in which the vibration level after the filter processing is calculated for each cylinder of the internal combustion engine, and the abnormal ignition determination value corrects the vibration level, at which the filter processing is implemented, for each cylinder of the internal combustion engine.

According to the control device of the internal combustion engine according to the present invention configured as above, the difference of the vibration levels between the cylinders can be corrected.

(8) Furthermore, the control device of the internal combustion engine according to the present invention is characterized in that, when detecting the abnormal ignition of the internal combustion engine, the abnormal ignition suppression control portion suppresses the abnormal ignition by at least one of a cut of fuel to be supplied to the internal combustion engine and a reduction of a suction air volume.

According to the control device of the internal combustion engine according to the present invention configured as above, according to such a configuration, the abnormal ignition can be suitably suppressed.

(9) Furthermore, the control device of the internal combustion engine according to the present invention is characterized in that the vibration level extraction portion extracts the vibration level used in the filter processing portion, in a crank angle range wider than that extracting the vibration level used in the knock control portion.

According to the control device of the internal combustion engine according to the present invention configured as above, according to such a configuration, since the extraction method of the vibration level for determining the knock can be set separately from the extraction method of the vibration level for determining the abnormal ignition, it is possible to implement the extraction of the suitable vibration level by each abnormal combustion.

(10) Furthermore, the control device of the internal combustion engine according to the present invention is characterized in that the vibration level extraction portion sets the vibration level used in the filter processing portion as a peak value in a predetermined crank angle range, and sets the vibration level used in the knock control portion as a peak value after an averaging processing in the predetermined crank angle range.

According to the control device of the internal combustion engine according to the present invention configured as above, according to such a configuration, between crank angles, at which the vibration level for determining the abnormal ignition is extracted, is set to be wider than between crank angles at which the vibration level for determining the knock is extracted. Thus, the vibration level for determining the abnormal ignition can be further accurately detected, whereby it is possible to prevent the noise component from being mixed with the vibration level for determining the knock.

(11) Furthermore, the control device of the internal combustion engine according to the present invention is characterized in that the vibration level extraction portion includes a gain correction portion which makes the gain relating to the signal to be output from the vibration sensor variable, and reduces the gain for a predetermined time when detecting the vibration level equal to or greater than the predetermined value.

According to the control device of the internal combustion engine according to the present invention configured as above, even in a case where the output level of the vibration sensor is increased by the abnormal combustion, when incorporating an A/D converter into a microcomputer in an electronic control unit, it is possible to perform a gain correction and incorporation to a suitable level.

Various modifications and alternations of this invention will be apparent to those skilled in the art without departing from the scope and spirit of this invention, and it should be understood that this is not limited to the illustrative embodiments set forth herein.

What is claimed is:

1. A control device of an internal combustion engine comprising:
an operation state detecting portion that detects an operation state of the internal combustion engine;
a combustion control portion that controls a combustion state of the internal combustion engine depending on the detected operation state of the internal combustion engine;
a vibration sensor that is attached to a cylinder block of the internal combustion engine to detect the vibration of the internal combustion engine;
a vibration level extraction portion that extracts a vibration level of a predetermined frequency range in the vibration detected by the vibration sensor within a predetermined crank angle range of the internal combustion engine; and
a knock control portion which compares the extracted vibration level to a knock determination value, when it is determined that the vibration level is equal to or greater than the knock determination value, determines that a knock is generated in the internal combustion engine, performs a retard correction of an ignition timing of the internal combustion engine, and suppresses the knock,
wherein the control device includes
a filter processing portion that performs a filter processing on the vibration level extracted by the vibration level extraction portion and calculates the vibration level after the filter processing; and
an abnormal ignition suppression control portion which compares the vibration level after the filter processing to the abnormal ignition determination value when the retard correction equal to or greater than a predetermined value is performed by the knock control portion, in a case where it is determined that the vibration level after the filter processing is equal to or greater than the abnormal ignition determination value, determines that the abnormal ignition is generated in the internal combustion engine, corrects and controls the combustion control portion in a direction of suppressing the abnormal ignition.

2. The control device of the internal combustion engine according to claim 1,
wherein the knock determination value is set as a value smaller than the abnormal ignition determination value.

3. The control device of the internal combustion engine according to claim 1,
wherein the filter processing portion switches over a filter coefficient such that, when the vibration level in the current stroke in an action stroke of the internal combustion engine is equal to or greater than the vibration level after the filter processing in the previous stroke, a reflection ratio of the vibration level in the current stroke is increased as compared to when the vibration level in the current stroke is smaller than the vibration level after the filter processing in the previous stroke.

4. The control device of the internal combustion engine according to claim 1,
wherein the filter processing portion limits the vibration level, at which the filter processing is implemented, by an upper limit value.

5. The control device of the internal combustion engine according to claim 1,
wherein the filter processing portion corrects the vibration level, at which the filter processing is implemented, depending on a rotational speed of the internal combustion engine.

6. The control device of the internal combustion engine according to claim 1,
wherein the filter processing portion includes a configuration in which the vibration level after the filter processing is calculated for each cylinder of the internal combustion engine, and
the abnormal ignition determination value is set for each cylinder.

7. The control device of the internal combustion engine according to claim 1,
wherein the filter processing portion includes a configuration in which the vibration level after the filter processing is calculated for each cylinder of the internal combustion engine, and
the abnormal ignition determination value corrects the vibration level, at which the filter processing is implemented, for each cylinder of the internal combustion engine.

8. The control device of the internal combustion engine according to claim 1,
wherein, when detecting the abnormal ignition of the internal combustion engine, the abnormal ignition suppression control portion suppresses the abnormal ignition by at least one of a cut of fuel to be supplied to the internal combustion engine and a reduction of a suction air volume.

9. The control device of the internal combustion engine according to claim 1,
wherein the vibration level extraction portion extracts the vibration level used in the filter processing portion, in a crank angle range wider than that extracting the vibration level used in the knock control portion.

10. The control device of the internal combustion engine according to claim 1,
wherein the vibration level extraction portion sets the vibration level used in the filter processing portion as a peak value in a predetermined crank angle range, and sets the vibration level used in the knock control portion as a peak value after an averaging processing in the predetermined crank angle range.

11. The control device of the internal combustion engine according to claim 1,
wherein the vibration level extraction portion includes a gain correction portion which makes the gain relating to the signal to be output from the vibration sensor variable, and reduces the gain for a predetermined time when detecting the vibration level equal to or greater than the predetermined value.

* * * * *